US012725431B2

(12) United States Patent
Schaefer et al.

(10) Patent No.: US 12,725,431 B2
(45) Date of Patent: Sep. 1, 2026

(54) SYSTEM AND METHOD FOR ASSOCIATING LANE BOUNDARY LINES

(71) Applicant: Toyota Jidosha Kabushiki Kaisha, Toyota (JP)

(72) Inventors: Alexander C Schaefer, Fremont, CA (US); Ryan M. Wiesenberg, South Lyon, MI (US)

(73) Assignee: Toyota Jidosha Kabushiki Kaisha, Toyota Aichi-ken (JP)

( * ) Notice: Subject to any disclaimer, the term of this patent is extended or adjusted under 35 U.S.C. 154(b) by 38 days.

(21) Appl. No.: 18/750,228

(22) Filed: Jun. 21, 2024

(65) Prior Publication Data

US 2025/0391180 A1 Dec. 25, 2025

(51) Int. Cl.
*G06V 20/56* (2022.01)
*G01C 21/00* (2006.01)

(52) U.S. Cl.
CPC ....... *G06V 20/588* (2022.01); *G01C 21/3815* (2020.08)

(58) Field of Classification Search
CPC .......................... G06V 20/588; G01C 21/3815
See application file for complete search history.

(56) References Cited

U.S. PATENT DOCUMENTS

| | | | | |
|---|---|---|---|---|
| 8,910,010 | B2 | 12/2014 | Cooke | |
| 9,395,192 | B1 | 7/2016 | Silver et al. | |
| 10,545,029 | B2 | 1/2020 | Yang et al. | |
| 10,761,535 | B2 | 9/2020 | Chen et al. | |
| 2010/0188507 | A1* | 7/2010 | Kageyama | G06V 20/588 348/148 |
| 2018/0033148 | A1* | 2/2018 | Zheng | G06V 20/588 |
| 2018/0197414 | A1* | 7/2018 | Oooka | B60T 7/12 |
| 2018/0349712 | A1* | 12/2018 | Kumano | G06V 20/588 |
| 2019/0026591 | A1* | 1/2019 | Fowe | G06F 18/23 |
| 2020/0132476 | A1* | 4/2020 | Roeth | G01C 21/3819 |
| 2021/0016780 | A1* | 1/2021 | Allan | B60W 30/18163 |
| 2021/0224557 | A1* | 7/2021 | Miyagawa | G01C 21/30 |
| 2021/0403001 | A1* | 12/2021 | Del Pero | G01C 21/3841 |
| 2023/0175852 | A1* | 6/2023 | Shambik | G01C 21/3602 701/28 |
| 2023/0211726 | A1* | 7/2023 | Nehushtan | G08G 1/09626 701/117 |
| 2023/0227034 | A1 | 7/2023 | Kamogari | |

(Continued)

OTHER PUBLICATIONS

Jiang et al., "Lane Detection and Tracking Using a New Lane Model and a Distance Transform", Machine vision and applications, 2011, 20 pages.

(Continued)

*Primary Examiner* — Abdalla A Khaled
(74) *Attorney, Agent, or Firm* — Christopher G. Darrow; Darrow Mustafa PC

(57) ABSTRACT

Systems and methods for associating lane boundary lines with each other are described. In one example, a system includes a processor and a memory having instructions that, when executed by the processor, cause the processor to segment boundary lines by a fixed length to generate segmented boundary lines and associate at least a portion of the segmented boundary lines with each other based on a metric between the segmented boundary lines. The portion of the segmented boundary lines that are associated with each other relates to a lane boundary.

15 Claims, 5 Drawing Sheets

(56) References Cited

U.S. PATENT DOCUMENTS

| | | | | |
|---|---|---|---|---|
| 2023/0341239 | A1* | 10/2023 | Ferencz | G01C 21/3819 |
| 2024/0005673 | A1* | 1/2024 | Kagimoto | G08G 1/167 |
| 2024/0135728 | A1* | 4/2024 | Ferencz | G01C 21/3804 |
| 2025/0033635 | A1* | 1/2025 | Münning | B60W 50/14 |
| 2025/0065900 | A1* | 2/2025 | Gideon | G06V 20/588 |
| 2025/0146835 | A1* | 5/2025 | Kaku | G01C 21/3833 |
| 2025/0292460 | A1* | 9/2025 | Deshmukh | G06T 11/23 |
| 2025/0341396 | A1* | 11/2025 | Jones | G01C 21/3867 |

OTHER PUBLICATIONS

Hoang et al., "Road Lane Detection by Discriminating Dashed and Solid Road Lanes Using a Visible Light Camera Sensor", Sensors, 2016, 23 pages.

* cited by examiner 600
602
603
604
602
703
603
603
704
604

SYSTEM AND METHOD FOR ASSOCIATING LANE BOUNDARY LINES

TECHNICAL FIELD

The subject matter described herein relates, in general, to systems and methods for associating lane boundary lines with each other for generating electronic maps.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with sensors that allow them to detect one or more boundary lines of a lane and/or nearby lanes of a road that the vehicle is traveling on. Typically, sensor information from multiple vehicles that are detecting the same boundary line is utilized to generate electronic maps. Determining which of the detected boundary lines from multiple vehicles are associated with a particular real-world boundary line can be computationally complex and prone to inaccuracies.

SUMMARY

This section generally summarizes the disclosure and is not a comprehensive explanation of its full scope or all its features.

In one example, a system includes a processor and a memory having instructions that, when executed by the processor, cause the processor to segment boundary lines by a fixed length to generate segmented boundary lines and associate at least a portion of the segmented boundary lines with each other based on a metric, such as a size of an area, between the segmented boundary lines. The portion of the segmented boundary lines that are associated with each other relates to a lane boundary. After that, an electronic map may be generated to include an electronic lane boundary using the portion of the segmented boundary lines that are associated with each other.

In another example, a method includes the steps of segmenting boundary lines by a fixed length to generate segmented boundary lines and associating at least a portion of the segmented boundary lines with each other based on a metric, such as a size of an area, between the segmented boundary lines. Like before, the portion of the segmented boundary lines that are associated with each other relates to a lane boundary, which can then be used to generate an electronic map.

In yet another example, a non-transitory computer-readable medium includes instructions that, when executed by a processor, cause the processor to segment boundary lines by a fixed length to generate segmented boundary lines and associate at least a portion of the segmented boundary lines with each other based on a metric, such as a size of an area, between the segmented boundary lines. Again, the portion of the segmented boundary lines that are associated with each other relates to a lane boundary, which can then be used to generate an electronic map.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for determining boundary line associations. Moreover, boundary lines, which may be generated from sensor data collected by vehicles, are electronic representations of an actual boundary line of one or more lanes of a road. Boundary lines generated from these detections can be utilized to generate electronic maps, especially electronic maps that can be utilized for routing and/or autonomous vehicle operations. However, boundary lines generated from numerous different detection vehicles (or even multiple passes by the same vehicle) need to be associated with each other so they can be used to determine the location of an actual boundary of a lane and be used to generate an electronic map.

The systems and methods described herein provide an accurate and computationally efficient methodology for associating boundary lines with each other. Moreover, the systems and methods described herein segment the boundary lines into fixed lengths. These segmented boundary lines are then associated with each other based on a metric, such as a size of an area, between them. Moreover, segmented boundary lines that have a relatively small amount of area defined in the space between them are more likely to be from the same actual boundary line than segmented boundary lines that have significantly larger areas defined in the space between them. Using this assumption, the systems and methods described herein can then associate boundary lines with each other based on the size of the area located between them. Once these associations are made, the boundary lines and their associations can then be utilized to generate an electronic map.

Figure 1:
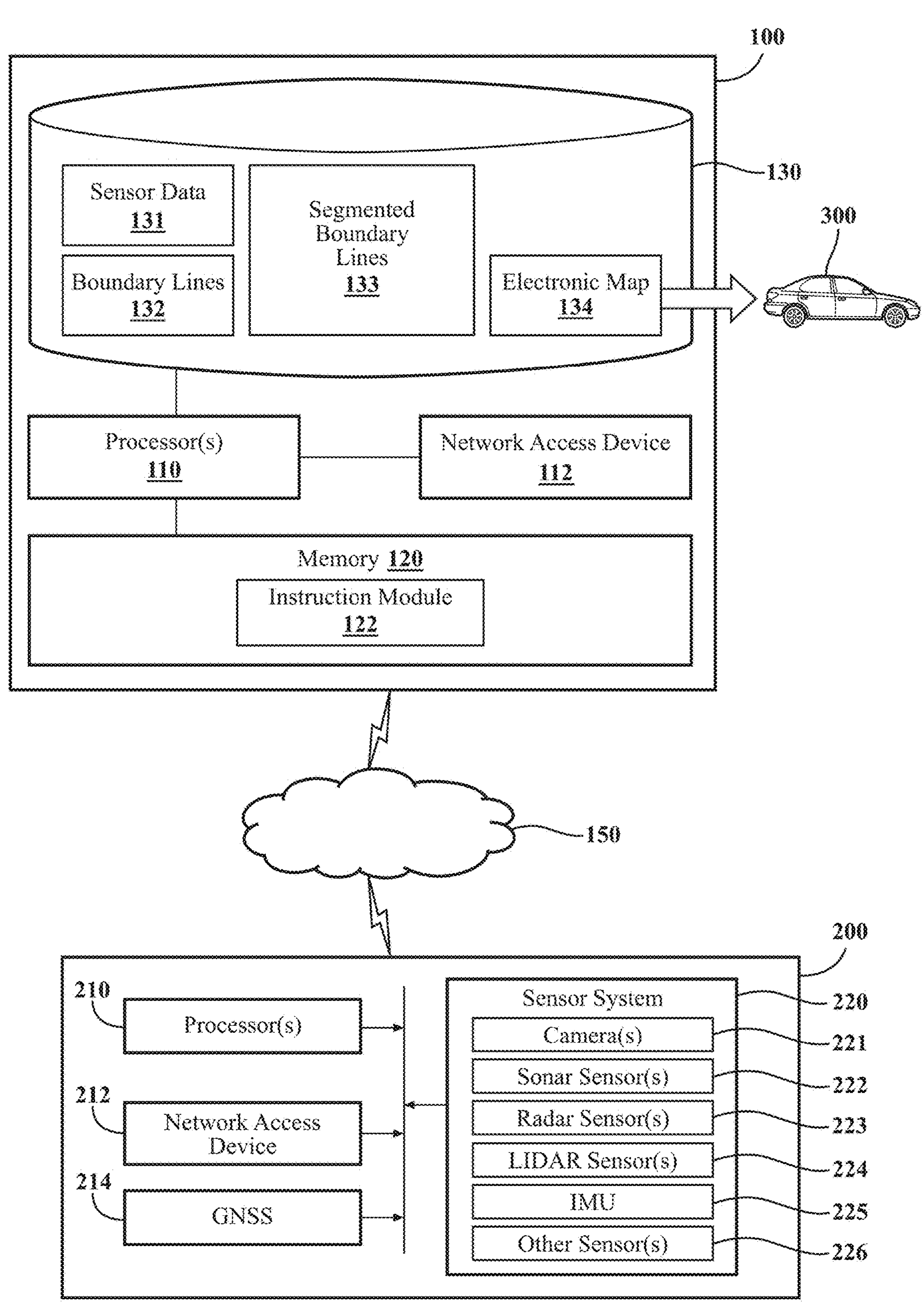
FIG. 1 illustrates a vehicle for collecting road-related information and a system for associating lane boundary lines based on the collected road-related information with each other for generating electronic maps.

Before providing a detailed description of how associations between boundary lines are made, a brief description of some of the hardware components that may be utilized will be provided. Moreover, FIG. 1 illustrates one example of a system 100 for associating segmented boundary lines 133 with each other using sensor data 131 collected from vehicles, such as the vehicle 200. The system 100 and/or the vehicle 200 also include various elements. It will be understood that in various embodiments it may not be necessary for the system 100 and/or the vehicle 200 to have all of the elements shown in FIG. 1. The system 100 and/or the vehicle 200 can have any combination of the various elements shown in FIG. 1. Further, the system 100 and/or the vehicle 200 can have additional elements to those shown in FIG. 1. In some arrangements, the system 100 and/or the vehicle 200 may be implemented without one or more of the elements shown in FIG. 1. While the various elements are shown as being located within the system 100 and/or the vehicle 200 in FIG. 1, it will be understood that one or more of these elements can be located external to the system 100 and/or the vehicle 200. Further, the elements shown may be physically separated by large distances and provided as remote services (e.g., cloud-computing services).

As will be explained in greater detail later in this description and mentioned briefly in the paragraphs above, the system 100 utilizes the sensor data 131 to generate boundary lines 132, which are electronic representations of a real-world lane boundary of a road. In turn, the boundary lines 132 are then segmented by a fixed length to generate segmented boundary lines 133. Once segmented, the segmented boundary lines 133 can be associated with each other based on the size of the area located between different segmented boundary lines.

The electronic map 134, or portions thereof, can then be made available to a vehicle 300 for navigation, routing, etc. For example, the electronic map 134, or portions thereof, may be stored or otherwise made available to one or more systems of the vehicle 300. For example, a vehicle navigation and/or autonomous driving system (if so equipped) of the vehicle 300 could utilize the electronic map 134 for routing, autonomous driving, etc.

The vehicle 200 can be any form of transport. In one or more implementations, the vehicle 200 is an automobile. While arrangements will be described herein with respect to automobiles, it will be understood that embodiments are not limited to automobiles. In some implementations, the vehicle 200 may be any robotic device or form of powered transport that, for example, includes one or more automated or autonomous systems, and thus benefits from the functionality discussed herein.

The vehicle 200 has a sensor system 220 that may include one or more sensors. "Sensor" means any device, component, and/or system that can detect, and/or sense something. The one or more sensors can be configured to detect and/or sense in real-time. As used herein, the term "real-time" means a level of processing responsiveness that a user or system senses as sufficiently immediate for a particular process or determination to be made, or that enables the processor to keep up with some external process. Here, in this example, the sensor system 220 includes camera(s) 221, sonar sensor(s) 222, radar sensor(s) 223, LIDAR sensor(s) 224, an inertial measurement unit 225, and/or other sensor(s) 226.

Essentially, the sensors 221-226, making up the sensor system 220, may have the ability to collect information regarding the boundaries of lanes that the vehicle 200 is traveling upon. The vehicle 200 may also include a global navigation satellite system (GNSS) 214 that may be able to receive information from a satellite constellation to provide positioning, navigation, and timing information to one or more processor(s) 210 of the vehicle 200.

Information from the sensor system 220 and/or other vehicle systems, such as the GNSS 214, may be processed by the processor(s) 210 of the vehicle 200 and provided to the system 100 using a network access device 212 that can package and transmit this information to the system 100 via a network 150. The network 150 may be a wireless network that allows for the transmission of information from the vehicle 200 to the system 100. The network access device 112 of the system 100 may then receive this information from the vehicle 200 and save this information as the sensor data 131. As will be explained, the sensor data 131 includes key point detections of lane boundaries and/or vehicle trace information that indicates the trajectory of the vehicle 200 when collecting data from the sensor system 220.

Returning to the system 100, the system 100 includes one or more processor(s) 110. Accordingly, the processor(s) 110 may be a part of the system 100, or the system 100 may access the processor(s) 110 through a data bus or another communication path. In one or more embodiments, the processor(s) 110 is an application-specific integrated circuit that is configured to implement functions associated with an instruction module 122. In general, the processor(s) 110 is an electronic processor, such as a microprocessor, which is capable of performing various functions as described herein.

In one example, the system 100 includes a memory 120 that stores instruction module 122. The memory 120 may be a random-access memory (RAM), read-only memory (ROM), a hard disk drive, a flash memory, or other suitable memory for storing the instruction module 122. The instruction module 122 is, for example, computer-readable instructions that, when executed by the processor(s) 110 cause the processor(s) 110 to perform the various functions disclosed herein.

Furthermore, in one example, the system 100 includes a data store 130. The data store 130 is, in one embodiment, an electronic data structure such as a database that is stored in the memory 120 or another memory and that is configured with routines that can be executed by the processor(s) 110 for analyzing stored data, providing stored data, organizing stored data, and so on. Thus, in one embodiment, the data store 130 stores data used by the instruction module 122 in executing various functions. As previously mentioned, the data store 130 can include sensor data 131, boundary lines 132 generated from the sensor data 131, segmented boundary lines 133 generated by segmenting the boundary lines 132, and/or the electronic map 134 that can be provided to the vehicle 300 for routing, navigation, or other purposes. It should be understood that this description of what can be stored in the data store 130 is not necessarily complete. As such, the data store 130 may store fewer or more different types of data than that described.

Figure 2A:
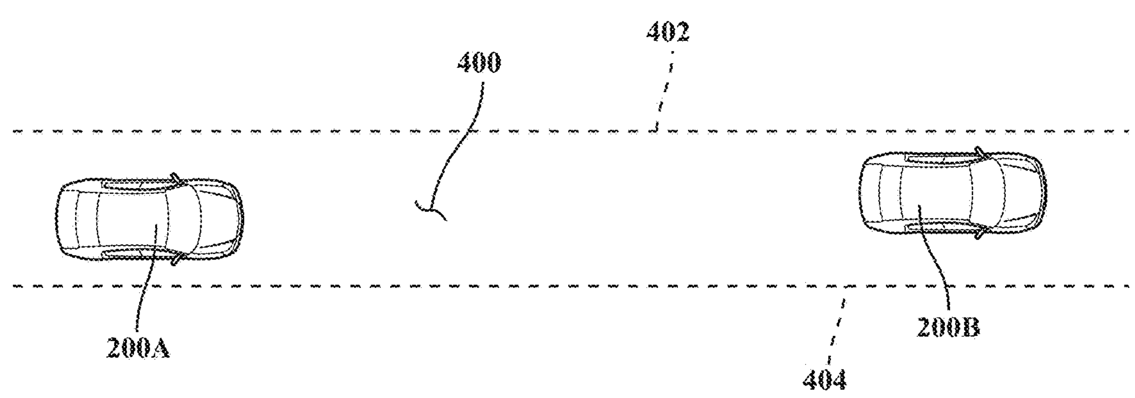
FIGS. 2A and 2B illustrate the collection of sensor data from vehicles and the generation of boundary lines from key point detections, respectively.

As mentioned before, the instruction module 122 contains instructions that cause the processor(s) 110 to perform any of the methodologies described herein. As mentioned before, these can include the steps for associating boundary lines with each other for the generation of electronic maps. At the outset, the instruction module 122 may contain instructions that cause the processor(s) 110 to determine boundary lines 132 using key point detections. Moreover, FIG. 2A illustrates vehicles 200A and 200B that may be similar to the vehicle 200 shown in FIG. 1. As such, the vehicles 200A and 200B may have similar components, such as the sensor system 220, for detecting boundaries 402 and 404 of the lane 400 that the vehicles 200A and 200B are traveling upon. Further still, the sensor system 220 may also be able to detect boundaries further away from the vehicles 200A and/or 200B. For example, boundaries of lanes that the vehicles 200A and/or 200B are not traveling upon can also be detected.

Figure 2B:
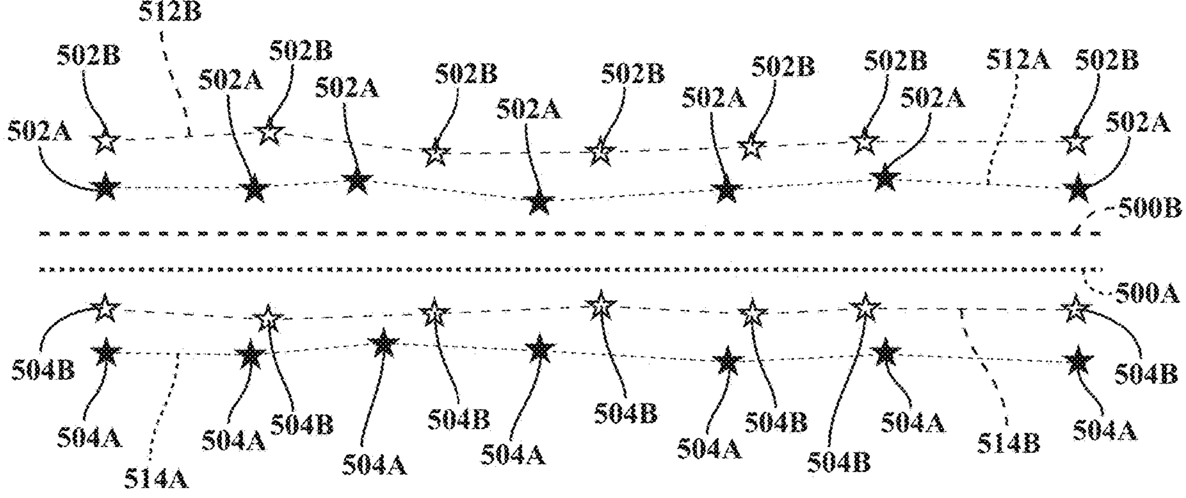

In one example, images collected from one or more camera(s) 221 of the sensor system 220 may be processed by the processor(s) 210 of the vehicles 200A and 200B to generate key point detections and vehicle trace information. Alternatively, raw sensor data, such as images from the camera(s) 221, can be provided directly to the system 100 for processing to generate the key point detections and vehicle trace information. As best shown in FIG. 2B, illustrated are left boundary key point detections 502A and 502B generated by the vehicles 200A and 200B, respectively. Also illustrated are right boundary key point detections 504A and 504B generated by the vehicles 200A and 200B, respectively. In addition, also generated are vehicle traces 500A and 500B of the vehicles 200A and 200B, respectively, illustrating the trajectories of the vehicles 200A and 200B when collecting sensor data used to generate the key point detections 502A, 502B, 504A, and/or 504B. The information regarding the key point detections 502A, 502B, 504A, and/or 504B and the vehicle traces 500A and 500B may be stored in the sensor data 131 of the data store 130.

The key point detections 502A, 502B, 504A, and/or 504B can be used to generate boundary lines, such as the boundary lines 512A, 512B, 514A, and 514B shown in FIG. 2B. Moreover, the boundary lines 512A and 512B represent the left boundary 402 of the lane 400 based on the key point detections 502A and 502B of the vehicles 200A and 200B, respectively. Additionally, the boundary lines 514A and 514B represent the right boundary 404 of the lane 400 based on the key point detections 504A and 504B of the vehicles 200A and 200B, respectively. Essentially, the instruction module 122 contains instructions that cause the processor(s) 110 to plot the boundary lines 512A, 512B, 514A, and 514B by connecting the key point detections 502A, 502B, 504A, and 504B, respectively. However, it should be understood that this is just one way to determine boundary lines. As such, other methodologies could also be used to determine boundary lines. As one example, boundary lines could be inferred from camera images using a machine-learning algorithm.

Figure 3A:
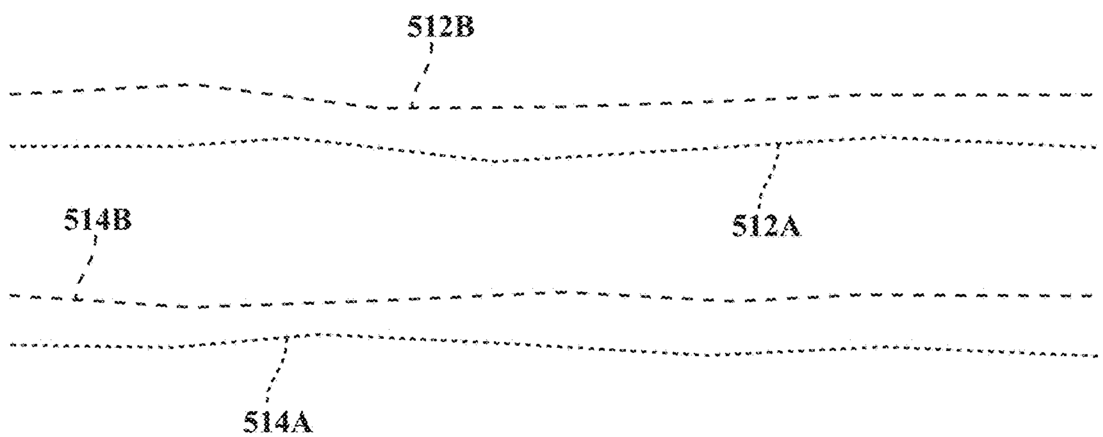
FIGS. 3A and 3B illustrate an example of boundary lines and the segmentation of the boundary lines, respectively.

As noticeable in FIG. 3A, the boundary lines 512A, 512B, 514A, and 514B do not exactly match up with one another. More simply, the boundary lines 512A and 512B, while representing the same boundary of the same lane, are not precisely located in the same position. Similarly, the boundary lines 514A and 514B are also not precisely located at the same position. Some of these variations can be explained by sensor noise, environmental interference, variations in processing power, sensor type, etc.

Figure 3B:
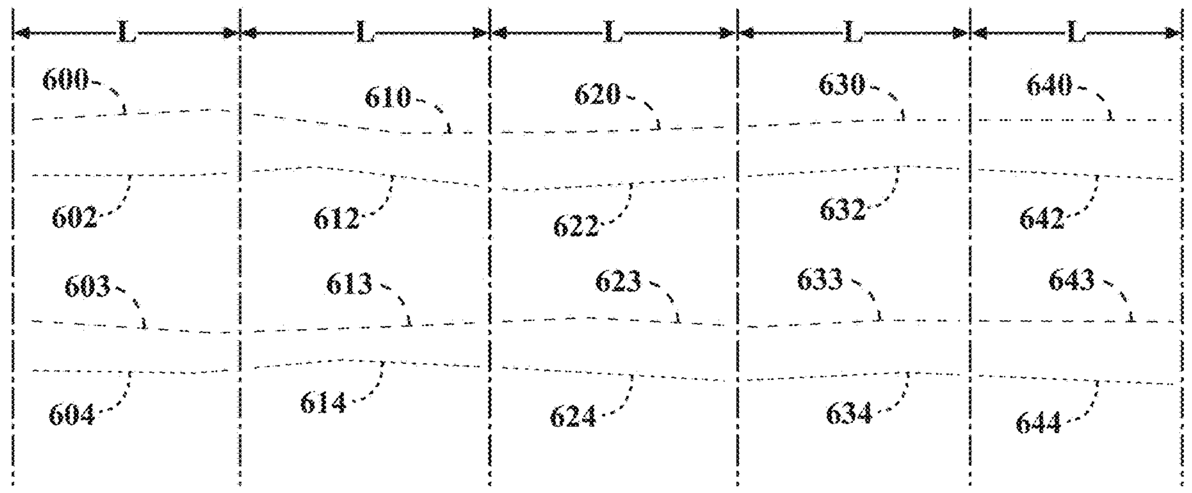

Once the boundary lines 512A, 512B, 514A, and 514B have been generated, the instruction module 122 contains instructions that cause the processor(s) 110 to segment the boundary lines 512A, 512B, 514A, and 514B by a fixed length. Moreover, FIG. 3A illustrates the boundary lines 512A, 512B, 514A, and 514B that have not yet been segmented. FIG. 3B illustrates the boundary lines 512A, 512B, 514A, and 514B each being segmented by a fixed length L. In one example, the fixed length L may be approximately 100 meters. However, it should be understood that the fixed length L can vary considerably and may be longer or shorter than 100 meters. In this example, the boundary lines 512A, 512B, 514A, and 514B have been segmented. More specifically, the boundary line 512B has been segmented into segmented boundary lines 600, 610, 620, 630, and 640. The boundary line 512A has been segmented into segmented boundary lines 602, 612, 622, 632, and 642. The boundary line 514B has been segmented into segmented boundary lines 603, 613, 623, 633, and 643. Finally, the boundary line 514A has been segmented into segmented boundary lines 604, 614, 624, 634, and 644.

The segmented boundary lines 604, 614, 624, 634, and 644 may be longitudinally aligned. In order to make sure they are aligned, one could generate an average trace line, segment this trace line, and then project the trace line segments onto the boundary lines to generate longitudinally aligned boundary line segments.

The segment generation of the boundary lines 512A, 512B, 514A, and 514B can be variable but based on some metric based on unique boundary lines. Further still, where the start and/or end of the segmentation of the boundary lines 512A, 512B, 514A, and 514B could be based on a number of different factors, such as where the boundary physically ends, splits, and/or merges, changes in color (i.e., from a white line indicating a boundary to a yellow line and vice versa), and type change (i.e., from a solid line to a dashed line and/or a curb to a barrier, etc.). The segmented boundary lines could then be derived based on a threshold deviation. For example, a segment could be created when unique boundaries per Y meters exceed X threshold, when the lateral distribution of unique boundaries exceeds X threshold, and/or some "learned" metric/threshold based on the distribution/boundary properties, etc.

Once the boundary lines 512A, 512B, 514A, and 514B have been segmented, the instruction module 122 contains instructions that cause the processor(s) 110 to determine areas in a space between the segmented boundary lines that project upon each other (or otherwise overlap each other at least partially) to determine if they should be associated with each other and therefore the same actual lane boundary. At a high level, this process is a clustering process. As such, it should be understood that any one of a number of different clustering algorithms could be utilized, not just those specifically described in the following paragraphs. Moreover, there are many different clustering algorithms, for example, DBSCAN and k-means, which could be utilized. Each clustering algorithm requires different input parameters, for example, the number of clusters, thresholds, and distances. Again, it should be understood that the clustering process described in the following paragraphs is just one type of clustering process that may be utilized.

Figures 4A, 4B:
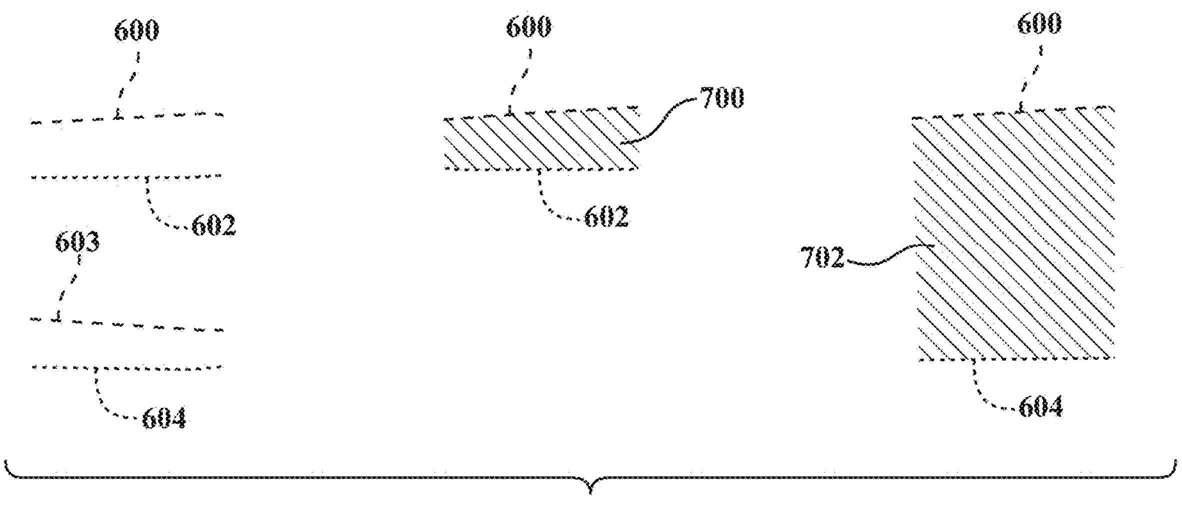
FIGS. 4A and 4B illustrate examples of determining when a pair of boundary lines should be associated with each other by utilizing the area between segments of the pair of boundary lines.

An example of this clustering process is illustrated in FIGS. 4A and 4B. FIG. 4A illustrates the segmented boundary lines 600, 602, 603, and 604. Using the segmented boundary line 600 and the segmented boundary line 602, the instruction module 122 causes the processor(s) 110 to determine the area 700 between the segmented boundary lines 600 and 602. In this example, the size of the area 700 is essentially the metric used to determine clustering. The area 700 may then be compared to a threshold size. If the area 700 is less than the threshold size, the instruction module 122 causes the processor(s) 110 to determine that the segmented boundary lines 600 and 602 should be associated with each other and, therefore, the same lane boundary. In this example, the area 700 has been determined to be less than a threshold size and, therefore, the segmented boundary lines 600 and 602 are to be associated with each other. The threshold size can vary from application to application. In some cases, the threshold size may be directly proportional to the fixed length L for segmenting the boundary lines.

It should be understood that area is just one metric that can be used to quantify line similarity. Examples of other metrics are minimum distance of the two lines, maximum distance of the two lines, root mean square of corresponding points on the lines, sum of squared distances between a key point on one line and its projection onto the other line, etc. The last metric represents a probabilistic metric that is based on a Gaussian sensor model, whereas the other metrics are heuristics.

In yet another example, this clustering can use "boundary uniqueness" and properties to help create the cost function (uniqueness+distance) for the association to a single lane boundary. A low-cost example would be associating dashed white lines with other dashed white lines. A higher-cost example would be associating solid white lines with solid yellow lines. Even higher-cost examples could include associating a solid yellow line with a dashed white line (or vice versa) and/or a curb with a dashed white line. Optionally, boundary detections can be filtered out that do not have enough examples to be matched to a single lane boundary, either based on a static threshold or relative to other associations.

Still referring to FIG. 4A, the instruction module 122 continues this comparison process and causes the processor (s) 110 to determine the area 702 between the segmented boundary lines 600 and 604. In this example, it is determined that the area 702 is greater than a threshold size and, therefore, segmented boundary lines 600 and 604 are determined not to be associated with each other and, therefore, not associated with the same actual boundary.

This comparison process may be iterative and continues to compare the areas between different segmented boundary lines with each other. For example, referring to FIG. 4B, the instruction module 122 causes the processor(s) 110 to determine the area 703 between the segmented boundary lines 602 and 603 and the area 704 between the segmented boundary lines 603 and 604. In this example, the area 703 is determined to be above the threshold size, while the area 704 is determined to be below the threshold size. As such, based on this determination, the instruction module 122 causes the processor(s) 110 to determine that the segmented boundary lines 602 and 603 are not to be associated with each other while also determining that the segmented boundary lines 603 and 604 are to be associated with each other.

Once this iterative process is complete and all segmented boundary lines have been associated with each other and, therefore, a particular actual lane boundary, the instruction module 122 may cause the processor(s) 110 to generate one or more electronic maps. It should be understood that the generation of an electronic map can include creating from scratch an electronic map but also the updating of an already created electronic map.

Figure 5:
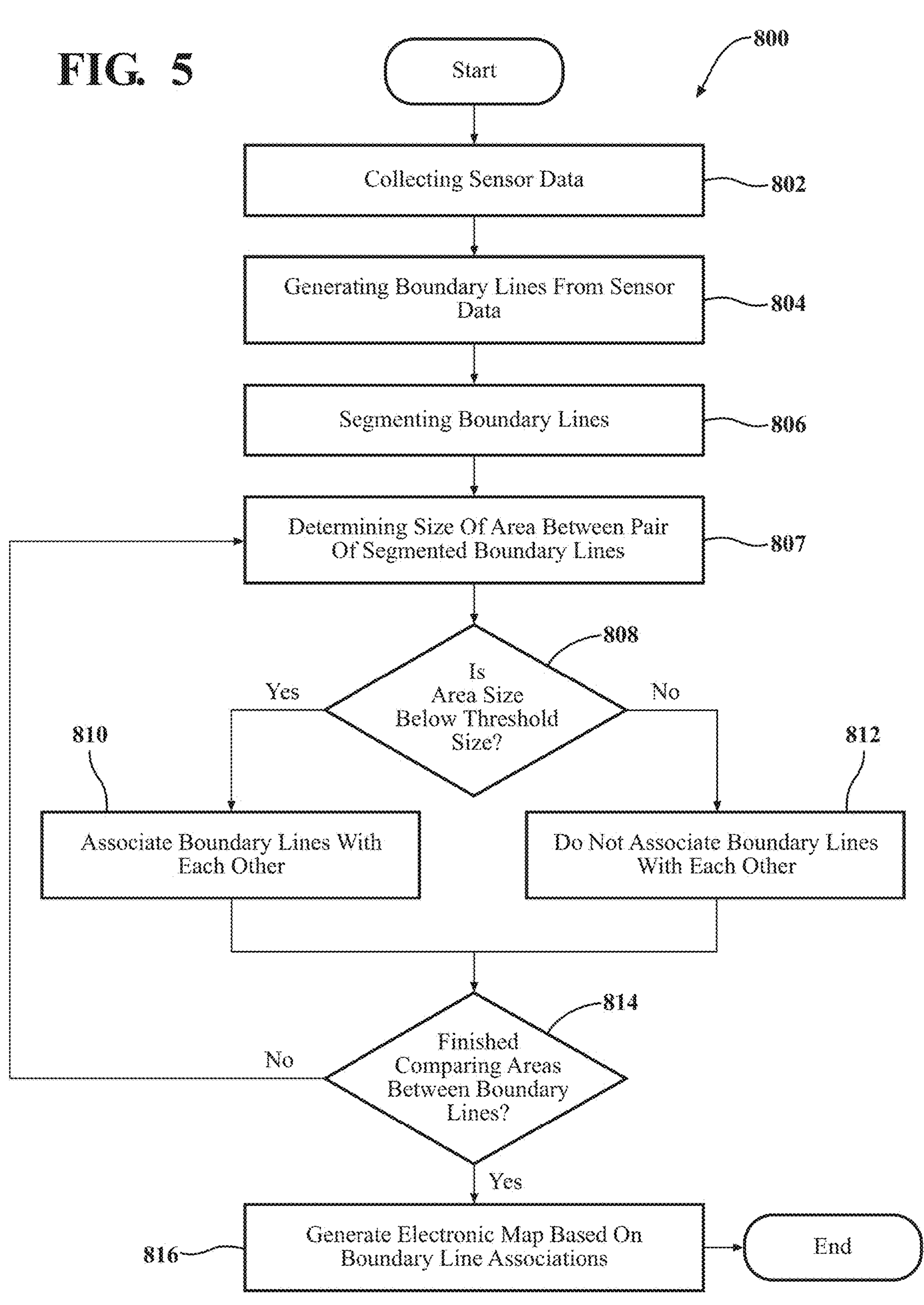
FIG. 5 illustrates a method for determining whether a pair of boundary lines should be associated with each other by utilizing the area between segments of the pair of boundaries lines.

Referring to FIG. 5, method 800 is shown for associating boundary lines with each other. The method 800 will be described from the viewpoint of the system 100 in FIG. 1. However, it should be understood that this is just one example of implementing the method 800. While method 800 is discussed in combination with the system 100, it should be appreciated that the method 800 is not limited to being implemented within the system 100, but is instead one example of a system that may implement the method 800.

In step 802, the instruction module 122 contains instructions that cause the processor(s) 110 to collect sensor data 131. Moreover, in one example, this may involve collecting images captured from one or more camera(s) 221 of the sensor system 220 of the vehicle 200. Once the sensor data 131 is collected, as shown in step 804, the instruction module 122 contains instructions that cause the processor(s) 110 to create boundary lines from the sensor data. Moreover, as previously explained, the sensor data 131 can be processed by the processor(s) 110 to generate key point detections, such as the key point detections 502A, 502B, 504A, and 504B, shown in FIG. 2B. From there, the instruction module 122 may cause the processor(s) 110 to generate boundary lines, such as the boundary lines 512A, 512B, 514A, and 514B shown in FIG. 2B by essentially connecting the key point detections 502A, 502B, 504A, and 504B, respectively.

In step 806, the instruction module 122 contains instructions that cause the processor(s) 110 to segment the boundary lines 512A, 512B, 514A, and 514B by a fixed length. Moreover, FIG. 3A illustrates the boundary lines 512A, 512B, 514A, and 514B that have not yet been segmented. FIG. 3B illustrates the boundary lines 512A, 512B, 514A, and 514B each being segmented by a fixed length L.

In step 807, the instruction module 122 contains instructions that cause the processor(s) 110 to determine areas in a space between the segmented boundary lines that project upon each other (or otherwise overlap each other at least partially) to determine if they should be associated with each other and therefore the same actual lane boundary. Moreover, areas between overlapping boundary lines are determined and then compared to a threshold size, as shown in step 808. If the areas are below a threshold size, the segmented boundary lines are associated with each other and, therefore, relate to the same real-world boundary line, as shown in step 810. Otherwise, if the area between the segmented boundary lines is above the threshold size, the segmented boundary lines are not associated with each other, as shown in step 812.

Steps 808 to 814 are essentially part of a clustering process and can vary significantly. As mentioned before, any one of a number of different clustering processes can be utilized, including, for example, DBSCAN and k-means. Again, it should be understood that the clustering process described in steps 808 to 814 is just one type of clustering process that may be utilized.

As mentioned before, the comparison of the areas located between segmented boundary lines is an iterative process and may continue until all overlapping segmented boundary lines have been compared to one another to determine if they should be associated. Once all these comparisons have been made, as best shown in step 814, the method 800 proceeds to step 816, where one or more electronic maps can be generated based on the segmented boundary line associations. The generation of the electronic map can include both the initial creation of the electronic map and/or the updating of a pre-existing electronic map.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor;

a memory in communication with the processor, the memory including an instruction module having instructions that, when executed by the processor, cause the processor to:

segment boundary lines by a fixed length to generate segmented boundary lines;

generate an average trace line corresponding to the boundary lines;

segment the average trace line by the fixed length;

project segments of the average trace line onto the boundary lines to generate longitudinally aligned segmented boundary lines;

associate at least a portion of the segmented boundary lines with each other after generating the longitudinally aligned segmented boundary lines by projecting segments of the average trace line onto the boundary lines based on a size of an area located between overlapping ones of the longitudinally aligned segmented boundary lines, wherein the portion of the segmented boundary lines that are associated with each other relate to a lane boundary;

generate an electronic map to include an electronic lane boundary using the portion of the segmented boundary lines that are associated with each other, the electronic lane boundary being an electronic representation of the lane boundary in the electronic map; and cause a vehicle to perform autonomous driving using the electronic map.

2. The system of claim 1, wherein the electronic map is at least partially disposed of in one or more systems of a vehicle.

3. The system of claim 1, wherein the fixed length is approximately 100 meters.

4. The system of claim 1, wherein the instruction module further comprises instructions that, when executed by the processor, cause the processor to generate, from key point detections from multiple detection vehicles, the key point detections indicating locations of a plurality of lane boundaries of a lane of a road.

5. The system of claim 4, wherein the instruction module further comprises instructions that, when executed by the processor, cause the processor to generate the boundary lines by connecting consecutive key point detections collected by a same vehicle of the multiple detection vehicles.

6. The system of claim 4, wherein the key point detections are based on image data captured from one or more cameras mounted to the multiple detection vehicles.

7. A method comprising:

segmenting boundary lines by a fixed length to generate segmented boundary lines;

generating an average trace line corresponding to the boundary lines;

segmenting the average trace line by the fixed length;

projecting segments of the average trace line onto the boundary lines to generate longitudinally aligned segmented boundary lines;

associating at least a portion of the segmented boundary lines with each other after generating the longitudinally aligned segmented boundary lines by projecting segments of the average trace line onto the boundary lines based on a size of an area located between overlapping ones of the longitudinally aligned segmented boundary lines, wherein the portion of the segmented boundary lines that are associated with each other relate to a lane boundary;

generating an electronic map to include an electronic lane boundary using the portion of the segmented boundary lines that are associated with each other, the electronic lane boundary being an electronic representation of the lane boundary in the electronic map; and causing a vehicle to perform autonomous driving using the electronic map.

8. The method of claim 7, wherein the electronic map is at least partially disposed of in one or more systems of a vehicle.

9. The method of claim 7, wherein the fixed length is approximately 100 meters.

10. The method of claim 7 further comprising generating, from key point detections from multiple detection vehicles, the key point detections indicating locations of a plurality of lane boundaries of a lane of a road.

11. The method of claim 10, further comprising generating the boundary lines by connecting consecutive key point detections collected by a same vehicle of the multiple detection vehicles.

12. The method of claim 10, wherein the key point detections are based on image data captured from one or more cameras mounted to the multiple detection vehicles.

13. A non-transitory computer-readable medium storing instructions that, when executed by a processor, cause the processor to:

segment boundary lines by a fixed length to generate segmented boundary lines;

generate an average trace line corresponding to the boundary lines;

segment the average trace line by the fixed length;

project segments of the average trace line onto the boundary lines to generate longitudinally aligned segmented boundary lines;

associate at least a portion of the segmented boundary lines with each other after generating the longitudinally aligned segmented boundary lines by projecting segments of the average trace line onto the boundary lines based on a size of an area located between overlapping ones of the longitudinally aligned segmented boundary lines, wherein the portion of the segmented boundary lines that are associated with each other relate to a lane boundary;

generate an electronic map to include an electronic lane boundary using the portion of the segmented boundary lines that are associated with each other, the electronic lane boundary being an electronic representation of the lane boundary in the electronic map; and cause a vehicle to perform autonomous driving using the electronic map.

14. The non-transitory computer-readable medium of claim 13, wherein the electronic map is at least partially disposed of in one or more systems of a vehicle.

15. The non-transitory computer-readable medium of claim 13, wherein the fixed length is approximately 100 meters.

* * * * *